US007988299B2

(12) United States Patent
Urakawa

(10) Patent No.: US 7,988,299 B2
(45) Date of Patent: Aug. 2, 2011

(54) HANDY IMAGE PROJECTION APPARATUS

(75) Inventor: Takashi Urakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/836,951

(22) Filed: Aug. 10, 2007

(65) Prior Publication Data

US 2008/0036923 A1 Feb. 14, 2008

(30) Foreign Application Priority Data

Aug. 11, 2006 (JP) ................................ 2006-219684

(51) Int. Cl.
*G03B 21/00* (2006.01)

(52) U.S. Cl. ............................ 353/34; 353/111; 353/42

(58) Field of Classification Search .................... 353/34, 353/111, 42
See application file for complete search history.

(56) References Cited

U.S. PATENT DOCUMENTS 4,151,583 A * 4/1979 Miller ........................... 362/205
4,396,262 A * 8/1983 Laizans et al. .................. 353/43
4,805,175 A * 2/1989 Knowles ......................... 372/24
7,058,432 B2 * 6/2006 Nishimoto ................. 455/575.1
7,270,421 B2 * 9/2007 Shinozaki ....................... 353/69
7,284,866 B2 * 10/2007 Buchmann ...................... 353/42

FOREIGN PATENT DOCUMENTS

EP 1444639 5/2005
JP 2003-043576 2/2003

* cited by examiner

*Primary Examiner* — Tony Ko
(74) *Attorney, Agent, or Firm* — Fitzpatrick, Cella, Harper & Scinto

(57) ABSTRACT

A handy image projection apparatus includes a main body containing a projection optical unit configured to project an image from its front part, with the main body having a gravity center, and an operation member provided on an outer face of the main body. The operation member is operated by a user's hand holding the main body when the image is being projected. When the apparatus is viewed from a first direction facing the outer face, at least part of the operation member is disposed in a front-rear direction of the apparatus, at one of a first position corresponding to the gravity center of the main body and a second position located at a distance within ⅓ of a length from the gravity center to the front part of the main body in the front-rear direction.

9 Claims, 16 Drawing Sheets

C
801
801
802
L/3
A
103a
103
L
101

HANDY IMAGE PROJECTION APPARATUS

BACKGROUND OF THE INVENTION

The present invention relates to a so-called handy-size projector, i.e. a handy image projection apparatus.

When giving a presentation or lecture while projecting an image onto a projection surface such as a screen by an image projection apparatus, a laser pointer which displays a pointer by a laser beam is often used to point at a part of the projected image.

Recently, there has been proposed a handy image projection apparatus which is significantly more compact compared with conventional laid-down type image projection apparatuses and allows the user to project an image while holding the apparatus in one hand (Japanese Patent Laid-Open No. 2003-43576 and Japanese translation of PCT international application No. 2005-506580).

However, operating a laser pointer with one hand while holding such a handy image projection apparatus with the other hand causes both hands of the user to be occupied, and therefore can hardly be considered as a preferable usage form. Further, in such a usage form, it is likely that the pointer displayed by the laser pointer is significantly off-placed with respect to the image being projected by the handy image projection apparatus.

Therefore, it is desirable that a handy image projection apparatus has a pointer display function so that a pointer can be moved with respect to a projected image by operating an operation member such as a cross key or a stick provided in the handy image projection apparatus.

In a handy image projection apparatus having a pointer displaying function and an operation member for moving a pointer, it is necessary to prevent the apparatus from rotating (tilting) vertically or horizontally thereby causing the projected image to significantly shake when the operation member is operated with the apparatus being held in one hand. For this purpose, it is considered that the relationship between the gravity center position of the apparatus and the position of the operation member is important.

In this respect, neither Japanese Patent Laid-Open No. 2003-43576 nor a Japanese translation of PCT international application No. 2005-506580 discloses any specific relationship between the gravity center position of the apparatus and the position of the operation member.

BRIEF SUMMARY OF THE INVENTION

The present invention provides a handy image projection apparatus in which the relationship between the gravity center position of the apparatus and the position of the operation member is appropriately set so that the apparatus is not likely to produce posture changes such as rotation even when the operation member is operated with the apparatus being held in one hand.

A handy image projection apparatus as an aspect of the present invention includes a main body which projects an image from its front part, and an operation member which is provided on an outer face of the main body. At least part of the operation member is disposed, in a front-rear direction of the apparatus, at one of a position same as a gravity center of the apparatus and a position located at a distance equal to or shorter than ⅓ of the length in the front-rear direction of the apparatus forwardly away from the gravity center.

The present invention also provides as another aspect an image display system including the handy image projection apparatus and an image supply apparatus.

Further objects or features of the present invention will be made more apparent through preferred embodiments which will be described with reference to the following drawings.

DETAILED DESCRIPTION OF THE PREFERRED EMBODIMENTS

Hereinafter, preferred embodiments of the present invention will be described with reference to the accompanying drawings.

Embodiment 1

FIGS. 1 to 7 show a box-type handy image projection apparatus that is Embodiment 1 of the present invention. The handy image projection apparatus 101 can project an image 102 from a front end part 103*b* of a main body (housing 103) onto a projection surface such as a screen or wall, not shown. In the main body of this handy (a hand-held size, in other word, of a shape designed for holding with a hand, or intended for ordinarily holding with a hand) image projection apparatus, the direction for projecting an image is referred to as a front direction (front end part, front part), and the opposite direction thereof as a rear direction (rear end part, rear part).

Figure 1:
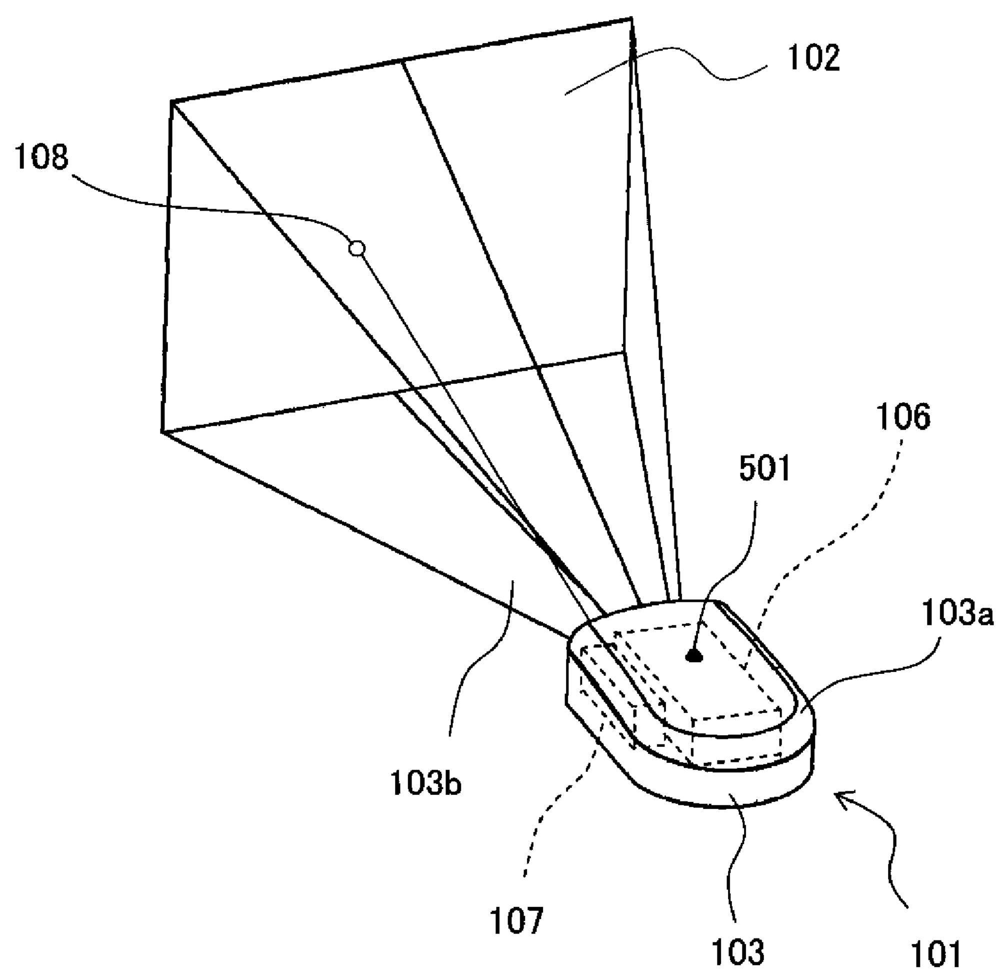
FIG. 1 is a perspective view of the handy image projection apparatus that is Embodiment 1 of the present invention.

The housing 103, which provides the appearance of the handy image projection apparatus 101, is sized to be held by a hand, i.e. has a handheld size. Within the housing 103, as shown in FIG. 1, a projection optical unit 106 which projects an image (dynamic or static image) 102 onto the projection surface and a pointer display optical unit 107 for displaying a pointer 108 for pointing at a part of the projected image 102 are accommodated. In the housing 103 a drive circuit and a battery which drive each optical unit and the like are also accommodated. The main body of the handy image projection apparatus 101 is made up of the housing 103, and all the items accommodated in the housing 103 such as optical units 106 and 107 and the battery.

Figure 3:
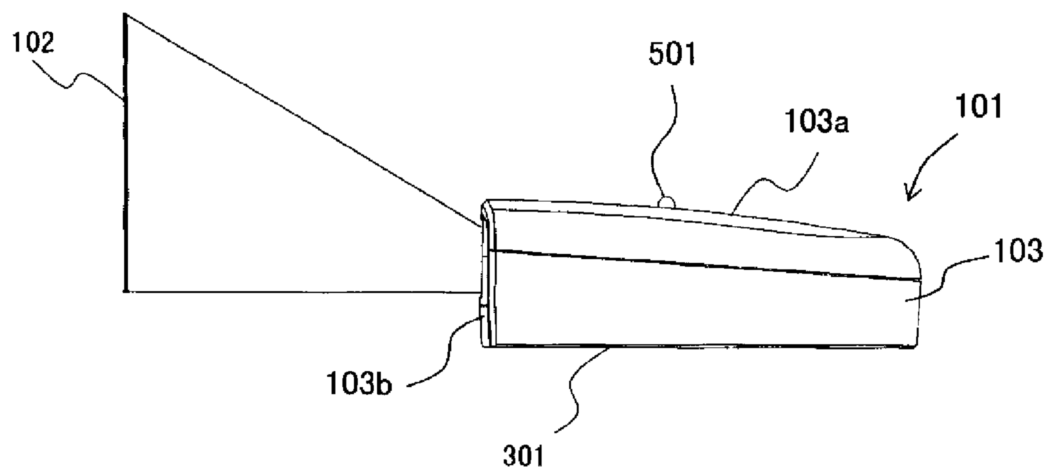
FIG. 3 is a side view of the handy image projection apparatus of Embodiment 1.
Figure 4:
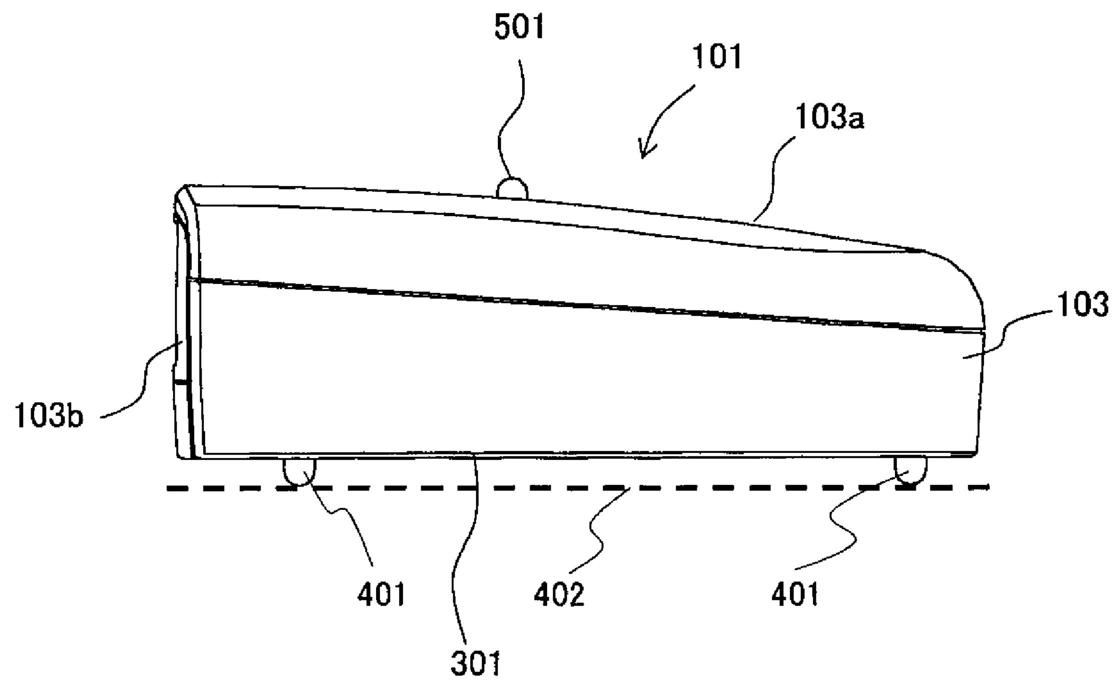
FIG. 4 is a side view of the handy image projection apparatus of Embodiment 1.
Figure 5:
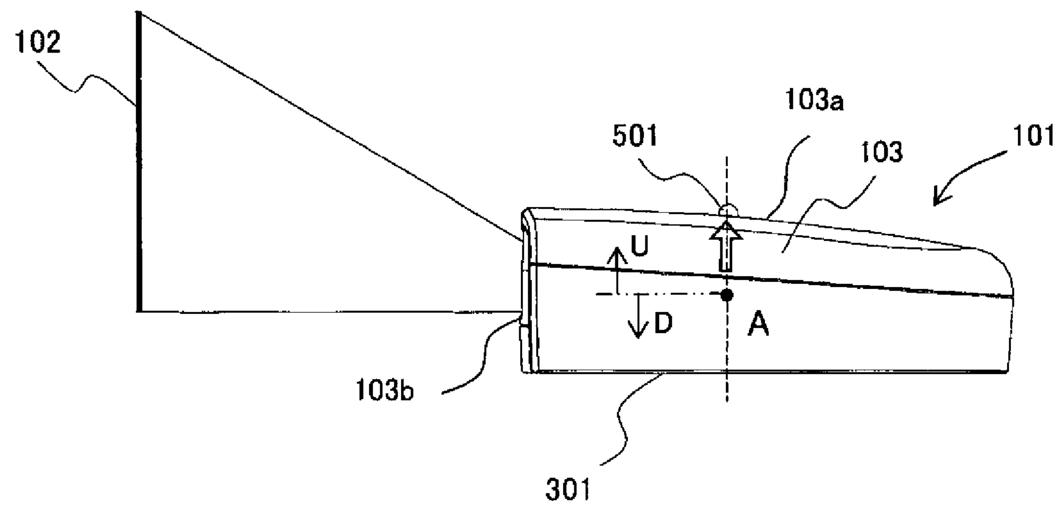
FIG. 5 is a figure showing the positional relationship between the gravity center position and the operation member in the handy image projection apparatus of Embodiment 1.

FIGS. 3 to 6 show a state of the handy image projection apparatus (main body) 101 in which the front end part 103*b* thereof is oriented forwardly (in the horizontal direction). In this state, as shown in FIG. 5 the region of the housing 103 which is located on the upper (U) side with respect to the position of the gravity center A (the gravity center will be described below) of the apparatus 101 is referred to as a top face part 103*a*. The top face part 103*a* is a face of the housing 103 opposite to the bottom face part 301 to be described later. Where, the top face part not only refers to an upward-facing face but also includes an obliquely upward-facing face and a sideward-facing face provided that it is on the upper side with respect to the position of the gravity center A (the position is hereinafter referred to also as the gravity center position A). This is also true in other embodiments to be described later. The top face part 103*a* is provided with an operation member 501.

Moreover, the face of the housing 103 which is located on the down (D) side than the gravity center A in the above described state is referred to as a bottom face part 301.

Furthermore, the state shown in FIGS. 3 and 5 is not intended to limit the usage form of the handy image projection apparatus 101 of the present embodiment, but merely shows an example of a normal usage form thereof. In an actual use, of course, the front end part 103*b* may be oriented obliquely upward or obliquely downward. This is also true in other embodiments to be described below.

Figure 6:
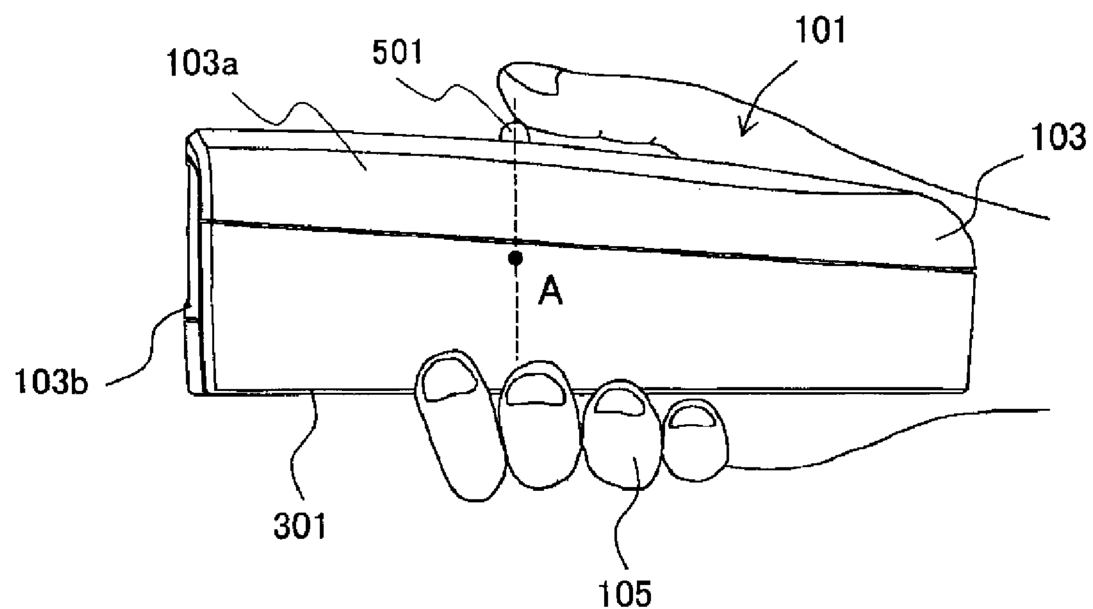
FIG. 6 is an explanatory drawing of the usage state of the handy image projection apparatus of Embodiment 1.
Figure 7:
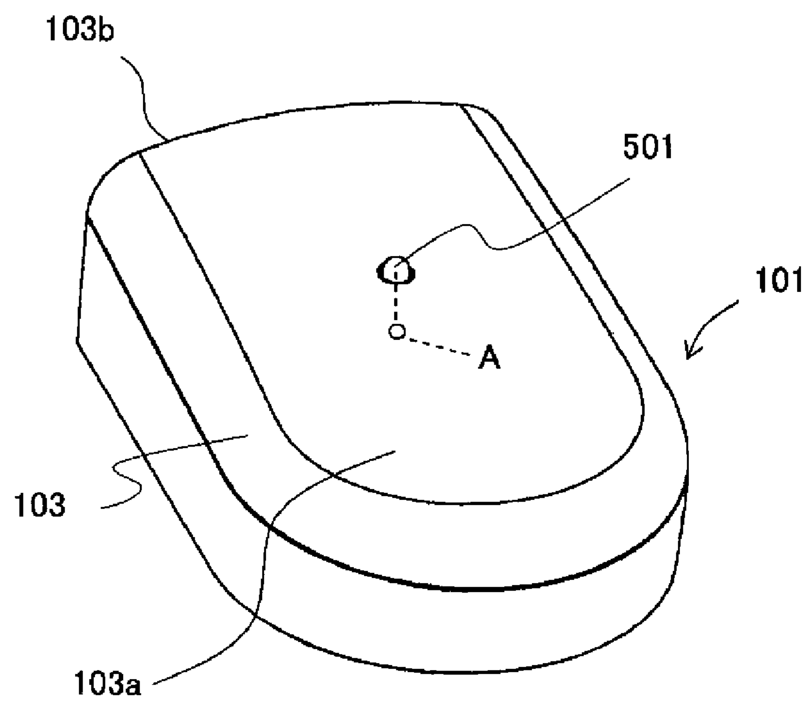
FIG. 7 is a perspective view of the handy image projection apparatus of Embodiment 1.

As shown in FIG. 6, the handy image projection apparatus 101 is held by a user with one hand 105. Specifically, the bottom face part 301 of the housing 103 is supported from below by the fingers other than the thumb of the one hand 105. Moreover, being put on the top face part 103*a*, the thumb can press down the housing 103 from above as well as operate the operation member 501.

Figure 2:
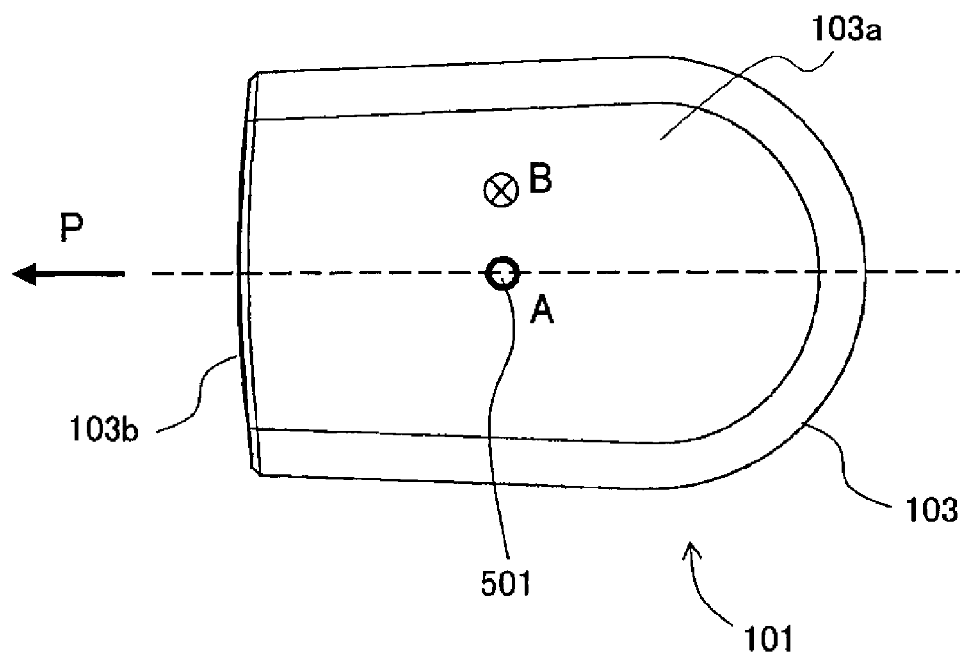
FIG. 2 is a top view of the handy image projection apparatus of Embodiment 1.

FIG. 2 shows the handy image projection apparatus 101 in a top view. The gravity center A of the handy image projection apparatus 101 is a gravity center of the apparatus as a whole including at least the main body and the operation member 501 (including other operation members if there are any). However, since the weight of the operation member 501 itself is significantly smaller than that of the main body, the gravity center A of the handy image projection apparatus 101 may be substituted by the gravity center of the main body.

The broken line in FIG. 2 shows the center line in the width direction (right-left direction) of the main body (housing 103) extending in the projection direction (front-rear direction). To hold the handy image projection apparatus 101 with one hand in a stable manner, the gravity center position A of the handy image projection apparatus 101 is disposed on the above described center line in a top view. When the gravity center position A is located off from the center line as shown by B, the handy image projection apparatus 101 is likely to be tilted toward the gravity center when being held with one hand. Therefore, the user must consciously hold the handy image projection apparatus 101 in such a way that its width direction is continually kept to be horizontal, thus impairing usability.

On the other hand, arranging the gravity center A on the centerline makes it easy to keep the handy image projection apparatus 101 to be horizontal in the width direction when holding it with one hand. Thereby, it becomes possible to stably hold the handy image projection apparatus 101 facilitating the projection of an image in a proper orientation, i.e. in an orientation in which the long side of the image becomes horizontal.

Moreover, the handy image projection apparatus 101 of the present embodiment can be used in a hand-held state as well as in a state of being laid down on a base such as a desk. For this purpose, in the present embodiment, the housing 103 is provided with a bottom face part 301 of a flat plane shape or a gently curved plane shape as shown in FIG. 3 and, in addition to that, protrusions 401 which provide a foot to contact the base 402 are formed at a plurality of locations in the bottom face part 301 as shown in FIG. 4. This makes it possible to stably lay down the handy image projection apparatus 101 on the base. Further, a plane 402 may also be considered to represent a bottom face which is a virtual plane passing through the lower ends of the plurality of protrusions 401.

Further, the protrusions 401 are also used as portions on which the finger is hooked when the handy image projection apparatus 101 is held with a hand. The protrusions 401 may be configured such that their protruding amounts (heights) are adjustable.

Next, the operation member 501 which is to be operated while an image is being projected will be described. The operation member 501 is, for example, a button to be operated by being pressed down to perform the switching of projected images or the switching of display/non-display of the pointer in the projected image. It is also a stick to be operated by being tilted to the front, rear, right and left from its non-operated state (neutral state) to move the displayed pointer in the projected image. The operation member 501 may be a cross key which is operable by pressing its operating portions provided at its front, rear, right and left positions. Further, an operation member of a mouse-pad type which uses a pressure sensitive sheet may be used.

Herein, the ‘front’ corresponds to the left in FIGS. 2 and 3, the ‘rear’, corresponds to the opposite thereto. The ‘upper side’ corresponds to the near side of the paper of FIG. 2 and the upper side in FIG. 3, and the ‘lower side’ corresponds to the opposite side thereto. Further, the ‘left’ corresponds to the lower side in FIG. 2 and the near side of the paper of FIG. 3. In addition, ‘to press down’ means pushing the operation member (button or operation portion) downward.

As shown in FIG. 5, the operation member 501 is disposed so as to include a position in the top face part 103*a* right above the gravity center A, that is, a position at which a vertical line passing through the gravity center A intersects with the top face part 103*a*. In other words, at least part of the operation member 501 is disposed in a portion in the front-rear direction of the outer face in which the gravity center A is located.

Thereby, it is possible to reduce a moment around the gravity center A which acts on the main body via the operation member 501 when the operation member 501 is operated with the thumb while the handy image projection apparatus 101 being held with one hand 105 as shown in FIG. 6. Therefore, it is possible to avoid the posture of the handy image projection apparatus 101 from becoming unstable such as being tilted vertically or horizontally by operation of the operation member 501, thereby suppressing a shake of the projected image.

Figure 8:
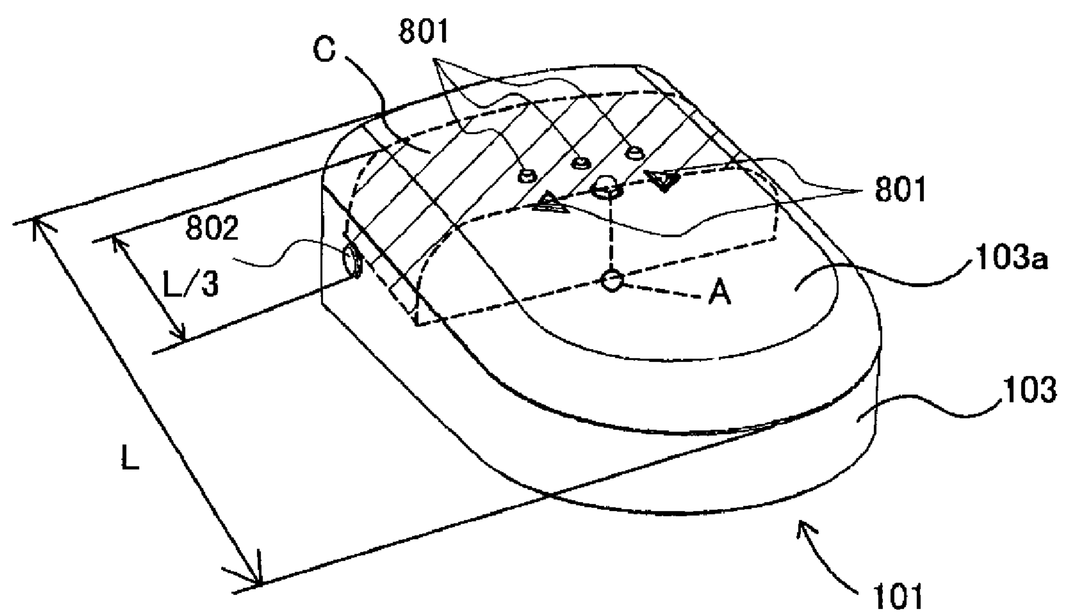
FIG. 8 is a perspective view showing a modified example of the handy image projection apparatus of Embodiment 1.

Although only one operation member 501 is shown in FIGS. 1 to 7, a plurality of operation members 801 may be provided as shown in FIG. 8. In this case, each operation member 801 is disposed such that at least part thereof is located in a fore-gravity-center region C described below in the top face part 103*a*. Where, the portion of the main body, which extends from the position in the front-rear direction at which the gravity center A is located to the position located at a distance of ⅓ of the length in the front-rear direction of the main body (that is, the housing 103 or the handy image projection apparatus 101) forwardly away from the gravity center A is specified to be a fore-gravity-center portion. The region of the top face part 103*a*, which constitutes the outer face of the aforementioned fore-gravity-center portion, is the fore-gravity-center region C.

FIG. 8 shows the above described fore-gravity-center region C (cross-hatched region). The term "at least part of each operation member 801" means that a portion which includes, for example, at least the center of each operation member 801.

Thereby, even when provided with a plurality of operation members 801, it is possible to reduce a moment around the gravity center A which acts on the main body when those operation members 801 are operated, and help avoiding the posture of the handy image projection apparatus 101 from becoming unstable when the operation members 801 are operated. Moreover, disposing the operation member 801 further forward or rearward of the fore-gravity-center region C makes it necessary to forcibly stretch or bend fingers when operating the operation member with the fingers of the hand which is holding the apparatus 101, thus not only impairing ease of operation but also leading to a shake of the apparatus 101, and therefore is not preferable.

Moreover, it is more preferable to limit the fore-gravity-center region C in a region corresponding to the outer face of the portion of the main body (handy image projection apparatus 101), which extends from the position in the front-rear direction at which the gravity center A is located, to the position at a distance of ⅕ of the length L in the front-rear direction of the main body forwardly away form the gravity center A. This makes it possible to more reliably avoid the posture of the handy image projection apparatus 101 from becoming unstable when one or more of the operation members 801 is operated.

However, when it is difficult to dispose all of the operation members 801 within the above described fore-gravity-center region C, an operation member which is operated at a higher frequency while an image is being projected may be disposed in the fore-gravity-center region C and an operation member which is operated less frequently may be disposed outside the fore-gravity-center region C.

Further, an operation member 802 which is not operated while an image is being projected, for example, a power source button of the handy image projection apparatus 101 may be disposed outside the fore-gravity-center region C. This will make it possible to effectively use the area in which operation member 801 to be operated during image projection may be disposed.

Figure 9:
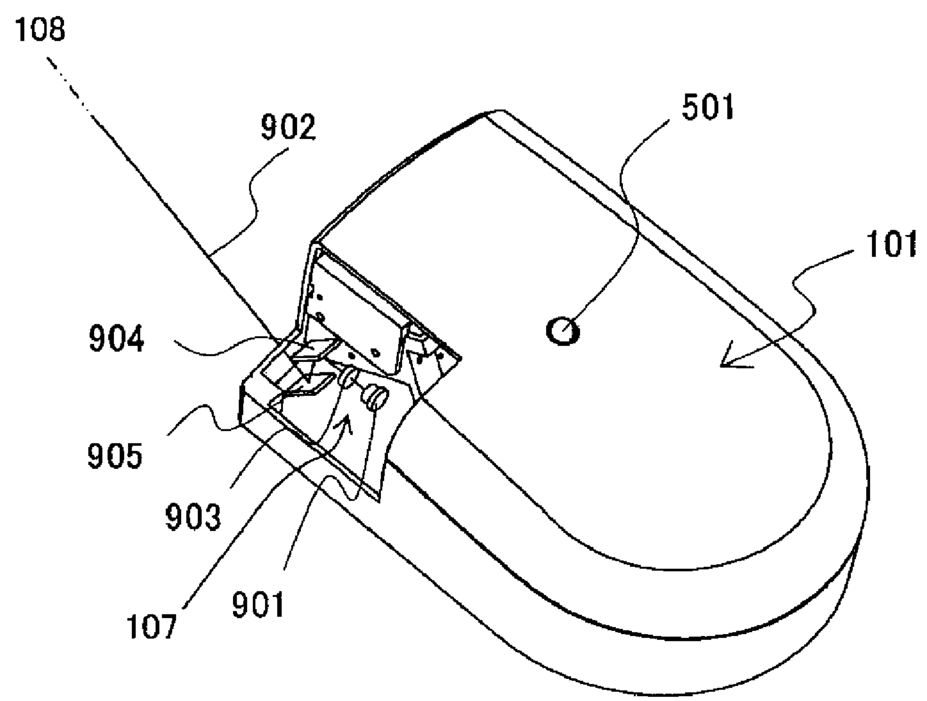
FIG. 9 is a perspective view showing a pointer display optical unit of the handy image projection apparatus of Embodiment 1.

Next, the pointer display function in the handy image projection apparatus 101 of the present embodiment will be described. FIG. 9 shows, with part of the housing 103*a* being cut out, a pointer displaying optical unit 107 which is accommodated in the housing 103.

The pointer displaying optical unit 107 uses a light source 901 different from the light source of the projection optical unit 106 shown in FIG. 1. A laser light source and the like are used as the light source 901. The luminous flux 902 emitted from the light source 901 passes through a collective lens 903 and then is reflected by a first returning mirror 904 and a second returning mirror 905 thereby being guided into a projected image.

In the present embodiment, the second returning mirror 905 is rotationally driven by an actuator, not shown, to deflect the luminous flux 902. However, the luminous flux 902 may be deflected by driving only the first returning mirror 904 or by driving both the first and second returning mirrors 904 and 905. Moreover, although two returning mirrors are used in the present embodiment, one or no less than 3 returning mirrors may also be used.

When the operation member 501 is pressed, the luminous flux 902 is emitted from the light source 901 and a pointer 108 is displayed (projected) in the projected image. When the operation member 501 is pressed again while the light source 901 is in a light-emitting state, the light source 901 becomes a non-light-emitting state.

In the present embodiment, though it is configured such that the display/non-display of the pointer 108 can be selected by a press operation of the operation member 501, it may also be configured such that the selection can be performed by tilting or pulling the operation member 501. Further, it may be configured such that the display/non-display of the pointer is selected by operating an operation member different from the operation member 501.

In the present embodiment, setting is made such that immediately after the light source 901 is turned into a light-emitting state, the pointer 108 points at the center of the projected image. Therefore, when the light source 901 is turned off, the rotational position of the second returning mirror 905 returns to the initial position so that the pointer 108 points at the center of the projected image when the light source 901 is turned into the light-emitting state next time.

Operating the operation member 501 so as to be tilted to the front, rear, right and left causes the second returning mirror 905 to rotate depending on the operation direction, thereby moving the pointer 108 with respect to the projected image.

The pointer 108 is used while an image is being projected by the projection optical unit 106. Therefore, disposing the operation member 501 in the above-described region makes it possible to switch display/non-display of the pointer 108 or to move the pointer 108 by operating the operation member 501 almost without changing the posture of the apparatus 101, i.e. the position of the projected image.

Further, in the present embodiment, moving the pointer 108 upward may be achieved by tilting the operation member 501 provided in the top face part 103*a* to the front side. Further, moving the pointer 108 leftward may be achieved by tilting the operation member 501 to the left. In this way, providing the operation member 501 in the top face part 103*a* makes it possible to cause the user to easily recognize the relationship between the desired direction to move the pointer 108 and the direction to operate the operation member 501, thus improving ease of operation.

Further, adding a pointer display function to the handy image projection apparatus 101 whose essential function is to project an image makes it possible to keep the relative positions of the projected image and the pointer 108 unchanged even when the hand which is holding the handy image projection apparatus 101 shakes. This can avoid the occurrence of a bad visual condition in which the positional relationship between the projected image and the pointer continually changes such as when an image projection apparatus is held with one hand and a laser pointer is held by the other hand.

Figure 10:
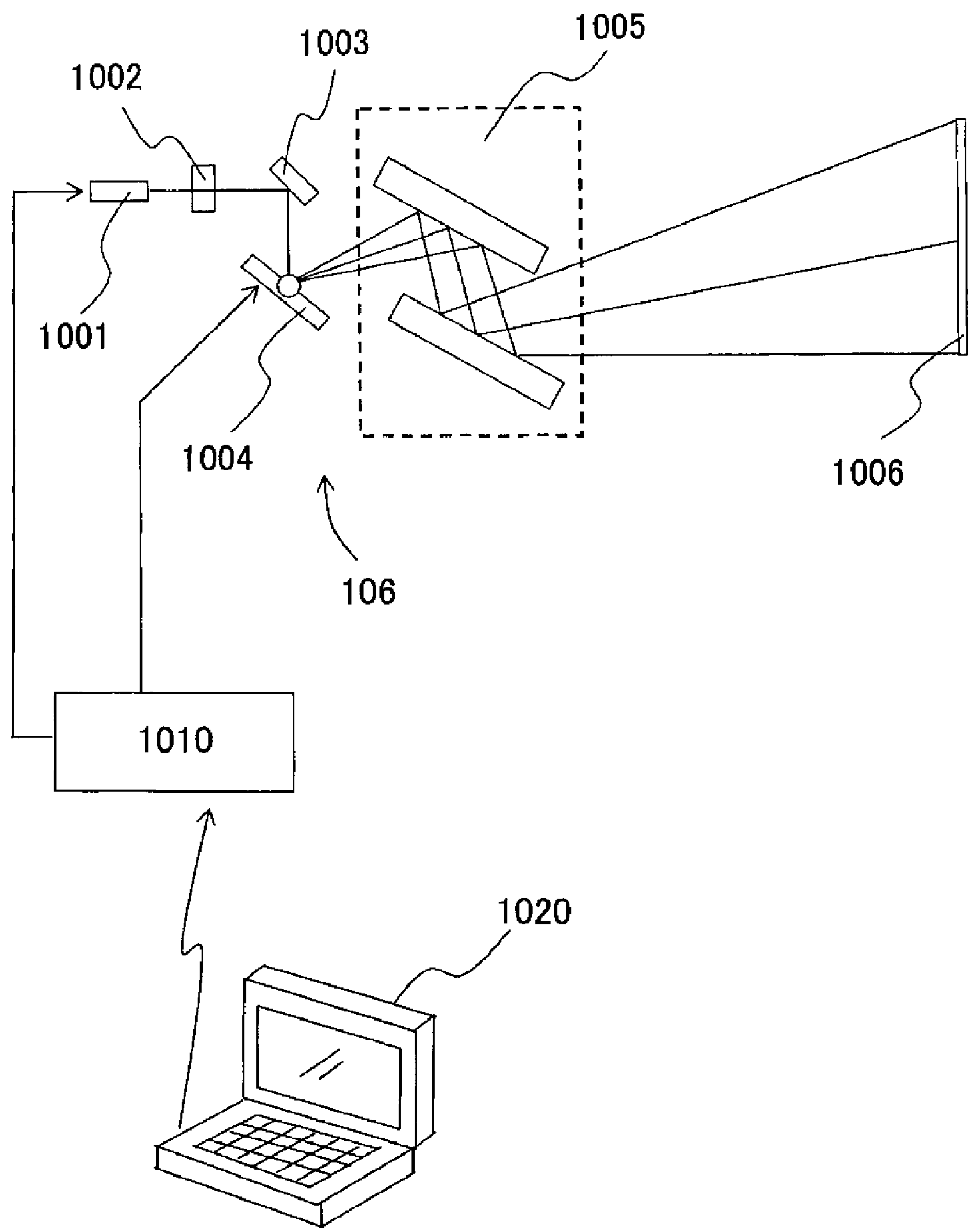
FIG. 10 shows the configuration of a projection optical unit of the handy image projection apparatus of Embodiment 1.

Next, a configuration example of a projection optical unit 106 of this embodiment is shown in FIG. 10. The luminous flux from the light source 1001 passes through a condensing lens 1002 and then is reflected by a returning mirror 1003 to enter into the scanning device 1004. The luminous flux scanned by a scanning device 1004 is reflected by a projection mirror system 1005 to draw an image 1006 onto a projection surface. Moreover, the scanning device 1004 and the light source 1001 are connected to a drive circuit 1010 to drive them.

Image information is supplied to the handy image projection apparatus 101 from an image supply apparatus 1020 such as a personal computer through wireless or wire communication. The drive circuit 1010 drives the scanning device 1004 and the light source 1001 depending on the image information. The handy image projection apparatus 101 and the image supply apparatus 1020 constitute an image display system. This is also true in other embodiments described below.

Figure 11:
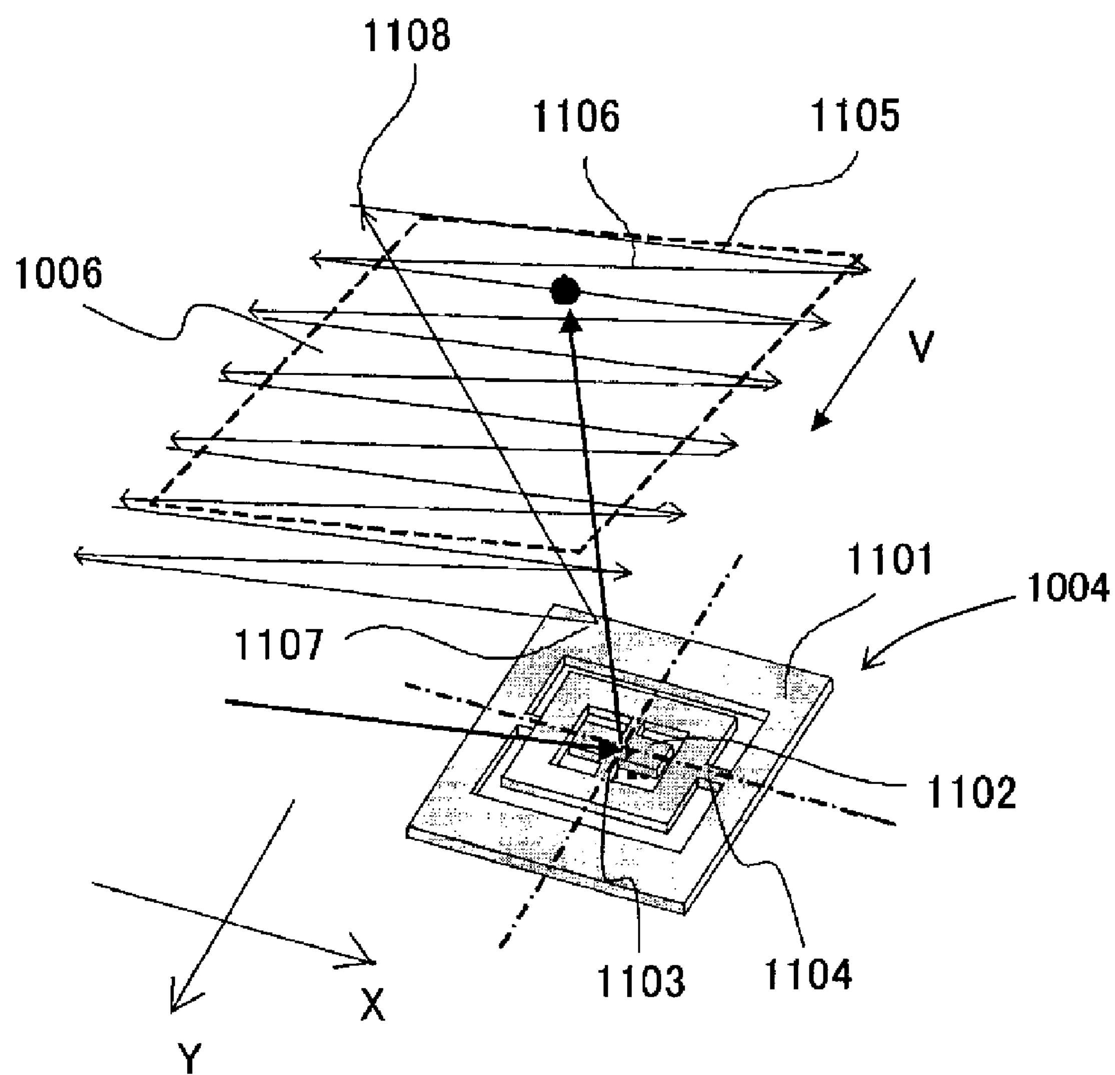
FIG. 11 is a figure showing a scanning device used in the projection optical unit of the handy image projection apparatus of Embodiment 1.

FIG. 11 shows the configuration of the scanning device 1004 and the manner in which a projected image 1006 is drawn. A reflection mirror 1102 is formed at the center of the scanning device 1004. The scanning device 1004 has a so-called gimbal structure which includes a torsion bar 1103 for swinging the reflection mirror 1102 around a vertical axis (y axis), and a torsion bar 1104 for swinging it around a horizontal axis (x axis).

The scanning device 1004 is made up of a Micro Electro-Mechanical System, MEMS, which is fabricated using semiconductor manufacturing processes.

The scanning device 1004 has an actuator, not shown, which uses electromagnetic force or electrostatic force to drive the reflection mirror 1102 around the vertical axis, so that the reflection mirror 1102 swings at a high speed through the resonant interaction of this structure. Moreover, the scanning device 1004 has an actuator, not shown, which swings the reflection mirror 1102 around the horizontal axis in synchronous with the swinging motion thereof around the vertical axis.

In FIG. 11, the line 1105 shows a forward path of the luminous flux (scanning line) which is scanned in the horizontal direction by the swinging motion of the reflection mirror 1102 around the vertical axis, and line 1106 shows a backward path of the luminous flux. In reality, the number of scanning lines is more than that shown in FIG. 11. The swinging motion of the reflection mirror 1102 around the horizontal axis to scan the scanning line in the vertical direction (V direction) in synchronous with the swinging motion of the reflection mirror 1102 around the vertical axis and the modulation of the light source 1001 can draw an image.

Upon reaching a scanning end 1107 in the vertical direction, the scanning line returns to a scanning start point 1108. That is, the repeating cycle of the scanning in the vertical direction determines the frame rate of the drawn image. Thus, the scanning device 1004 can scan the luminous flux two-dimensionally, thereby enabling raster scanning of a scanned surface (projection surface).

However, scanning devices in alternative embodiments of the present invention are not limited to one which scans the luminous flux two-dimensionally by a single reflection mirror, and two devices may be used, each of which scans the luminous flux one-dimensionally. Moreover, the configuration may be such that a one-dimensional scanning device is combined with a galvanomirror such that a luminous flux can be scanned two-dimensionally.

Further, the configuration of the projection optical unit is not limited to one which uses such a scanning device. For example, a DMD (Digital MicroMirror Device: Trademark) may be used.

Figure 12:
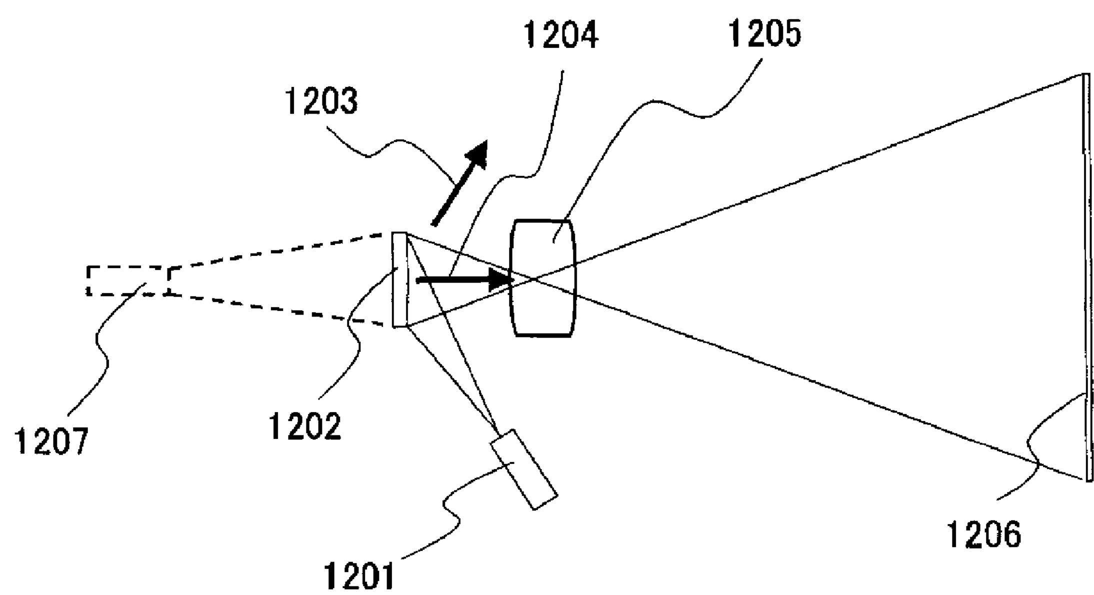
FIG. 12 is a figure showing a modified example of the projection optical unit of the handy image projection apparatus of Embodiment 1.

FIG. 12 shows a configuration example of a projection optical unit using the DMD. A luminous flux from a light source 1201 enters into a DMD 1202. The incident luminous flux is divided into an OFF reflected luminous flux 1203 and an ON reflected luminous flux 1204 by driving the DMD 1202. The ON reflected luminous flux 1204 is enlargingly projected to the projection surface by a projection lens 1205 to display an image 1206.

Figure 13:
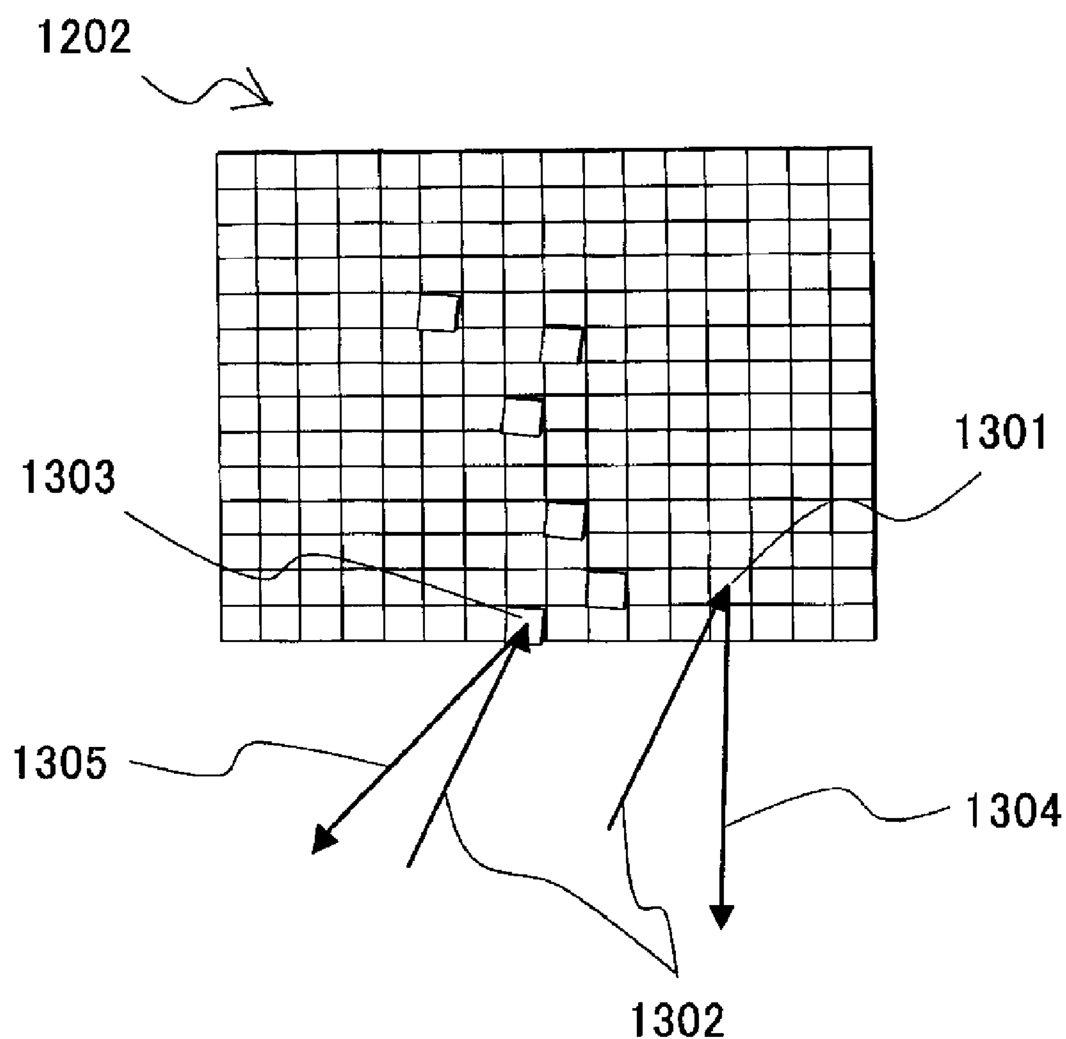
FIG. 13 is a figure showing a DMD used in the modified example shown in FIG. 12.

The DMD 1202 has the same number of reflection mirrors 1301 as the number of pixels constituting a projected image as shown in FIG. 13. An actual DMD 1202 has more reflection mirrors than those shown in FIG. 13.

The luminous flux 1302 emitted from the light source 1201 of FIG. 12 is irradiated onto each reflection mirror 1301 shown in FIG. 13. Each reflection mirror 1301 is set by a drive circuit, not shown, either at a position (1303) at which the luminous flux 1302 is reflected as an ON reflected luminous flux 1305 toward the projection lens 1205, or at a position at which the luminous flux 1302 is reflected as an OFF reflected luminous flux 1304 toward outside the projection lens 1205. The drive circuit is supplied with image information from an image supply apparatus such as a personal computer by wireless or wire communication. The drive circuit controls the switching of the positions of each reflection mirror 1301 depending on the image information.

The ON reflected luminous flux 1305 varies its intensity depending on the deflection time of the reflection mirror 1303 which reflects the luminous flux. This is used to carry out the tone representation of a projected image.

The light source 1201 shown in FIG. 12 may be configured such that each color luminous flux of Red, Green, and Blue is emitted in time order in synchronous with the switching of the position of the reflection mirror 1301. Moreover, the light source 1201 may be a white color light source, and the luminous flux from the aforementioned light source 1201 may be varied in time order into Red, Green, and Blue by using a color wheel.

Further, in place of the projection optical unit using the above described scanning device or DMD, a projection optical unit using a reflective or transmissive liquid crystal panel may be used. With the numeral 1202 being a transmission liquid crystal panel, FIG. 12 shows by a broken line a light source 1207 for illuminating the liquid crystal panel 1202.

As so far described, according to the present embodiment, the operation member 501 is disposed at an appropriate position with reference to the gravity center position A of the handy image projection apparatus 101. This offers an advantage in that even when the operation member 501 is operated while an image is being projected with the apparatus 101 being held by one hand, it is easy to maintain the posture of the apparatus 101 almost without changes. Therefore, it is possible to reduce a shake of the projected image in association with the operation of the operation member 501.

Embodiment 2

Figure 14:
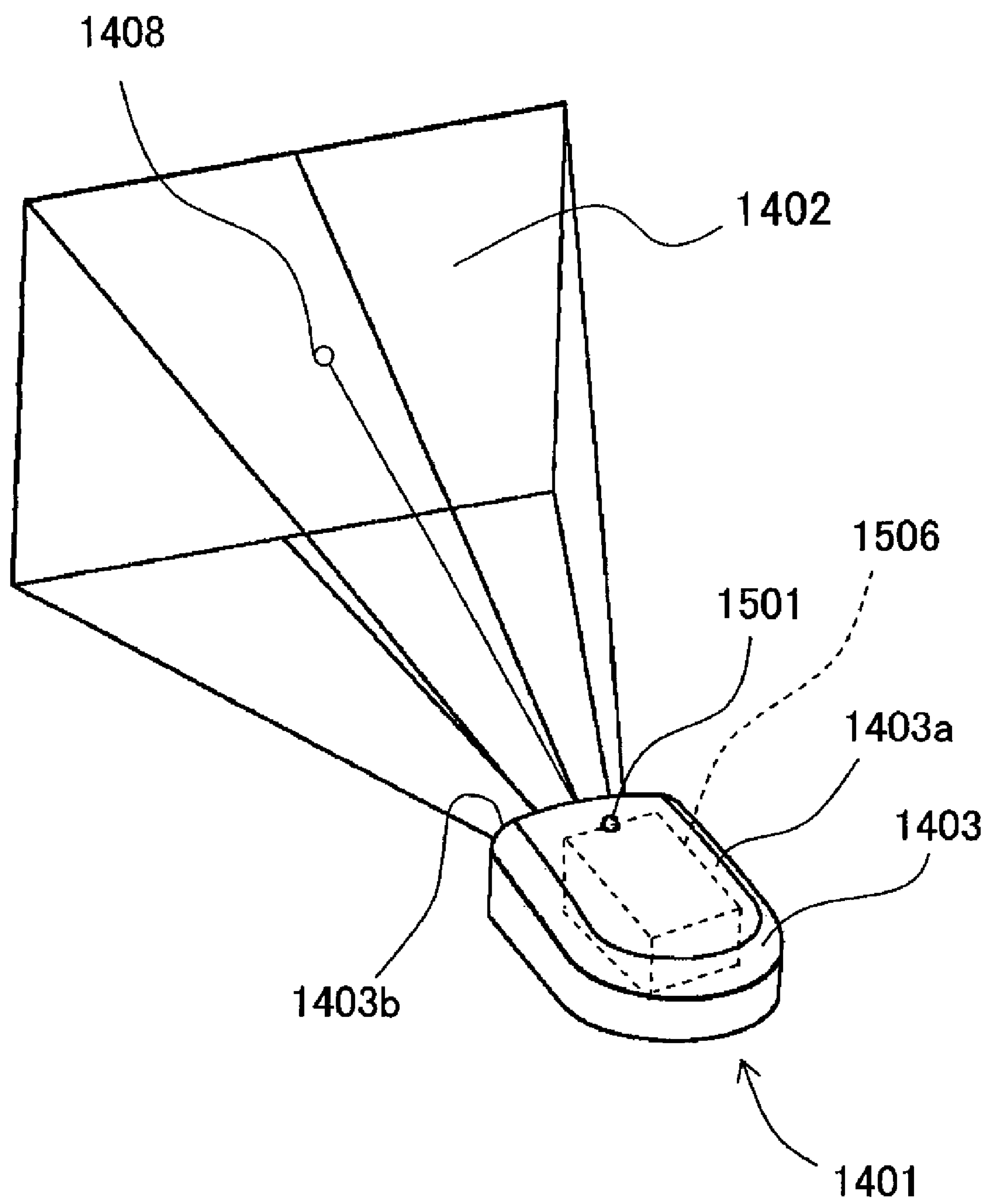
FIG. 14 is a perspective view of the handy image projection apparatus that is Embodiment 2 of the present invention.
Figure 15:
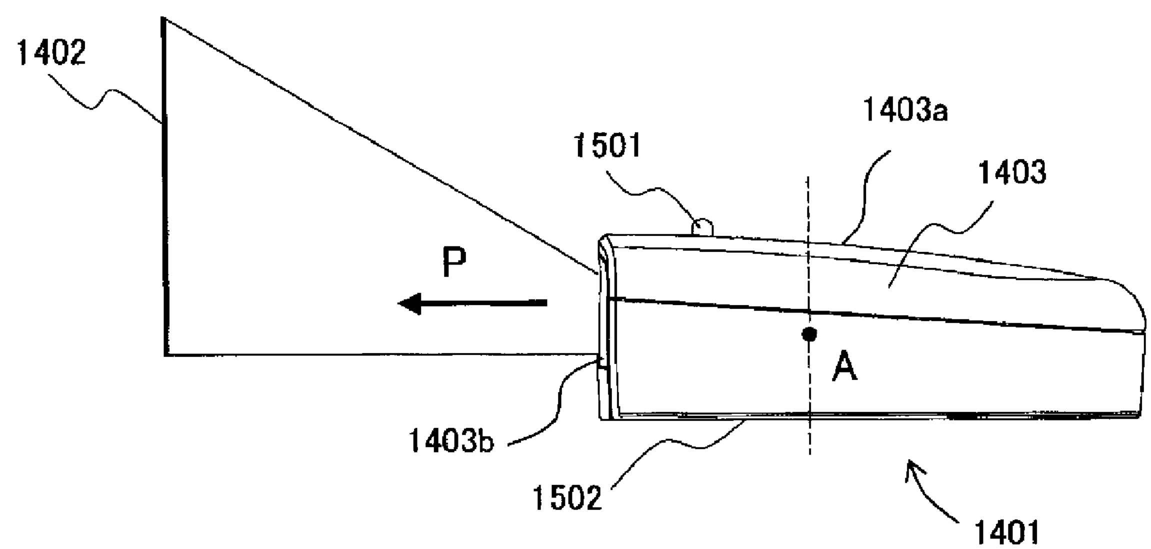
FIG. 15 is a side view of the handy image projection apparatus of Embodiment 2.
Figure 16:
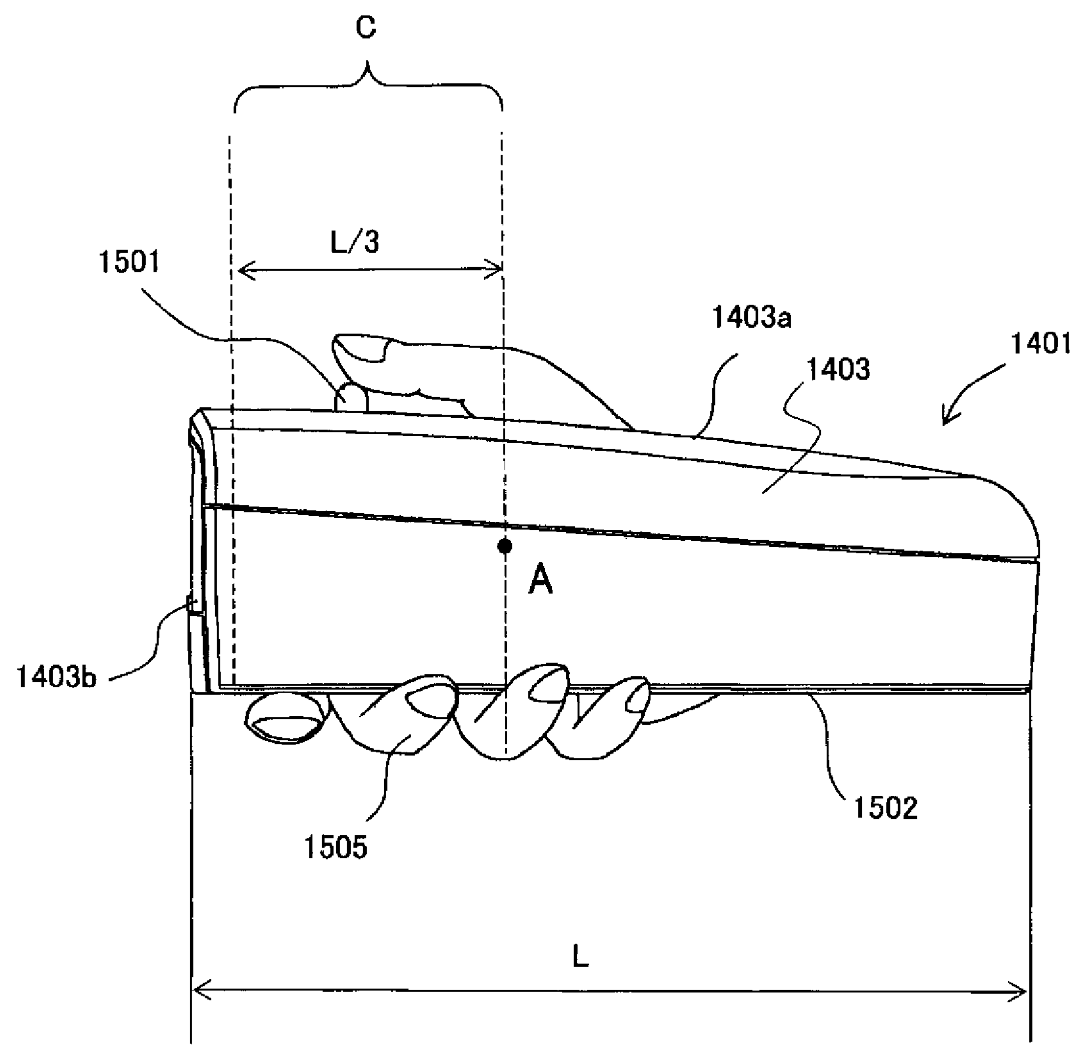
FIG. 16 is a figure showing the positional relationship between the gravity center and the operation member in the handy image projection apparatus of Embodiment 2.

FIGS. 14 to 16 show a handy image projection apparatus that is Embodiment 2 of the present invention. The handy image projection apparatus 1401 of the present embodiment is also configured in a box shape as with Embodiment 1.

The handy image projection apparatus 1401 can project an image 1402 from a front end part 1403*b* of the main body (housing 1403) onto a projection surface such as a screen or wall, not shown.

The housing 1403, which gives the appearance of the handy image projection apparatus 1401, is sized to be held by a hand, that is, has a handheld size. Inside the housing 1403, as shown in FIG. 14, a projection optical unit 1506 which projects an image 1402 onto a projection surface is accommodated. In the present embodiment, the projection optical unit 1506 has a function of displaying a pointer 1408 which points at a part of the projected image. Moreover, in the housing 1403, a drive circuit and a battery for driving each optical unit and the like are accommodated. The main body of the handy image projection apparatus 1401 is made up of the housing 1403, and all the accommodated items in the housing 1403 such as the projection optical unit 1506 and the battery.

Here, FIGS. 15 and 16 show a state of the handy image projection apparatus 1401 (main body) in which the front end part 1403*b* thereof is oriented forwardly (in the horizontal direction). In this state, an operation member 1501 is disposed in the top face part 1403*a* which is located on the upper side than the gravity center A of the apparatus 1401.

The handy image projection apparatus 1401 of the present embodiment is held with one hand 1505 of a user as shown in FIG. 16. Specifically, the bottom face part 1502 of the housing 1403 is supported from below by the fingers of the one hand 1505 other than the thumb. Moreover, the thumb of the one hand 1505 which is put on the top face part 1403*a* can press down from above the handy image projection apparatus 1401 as well as operate the operation member 1501.

Although not shown in the figure, when the handy image projection apparatus 1401 of the present embodiment is seen from above, the gravity center A of the apparatus 1401 is located on the center line in the width direction of the main body (housing 1403). Moreover, in the bottom face part 1502, protrusions which serve as a foot for stably laying down the apparatus on a base such as a desk are formed as with Embodiment 1.

Further, as shown in FIG. 16, the operation member 1501 of the present embodiment is disposed within the range of the fore-gravity-center region C, which has been described in Embodiment 1 (FIG. 8), excepting for the position right above the gravity center position A. This makes it possible to reduce a moment around the gravity center A which acts on the main body when the operation member 1501 is operated, and thus help avoiding the posture of the handy image projection apparatus 1401 from becoming unstable as the operation member 1501 is operated. Moreover, in the present embodiment, it is only necessary that at least part of the operation member 1501 be disposed in the fore-gravity-center region C. The term "at least part of the operation member 1501" means, for example, a portion of the operation member 1501 including at least the center thereof also in this embodiment.

However, as described in Embodiment 1, the length in the front-rear direction of the fore-gravity-center region C may be limited to be ⅕ of the length L in the front-rear direction of the main body. This makes it possible to avoid the posture of the handy image projection apparatus 1401 from becoming unstable.

Further, as in the present embodiment, disposing the operation member 1501 at a position forward of the position right above the gravity center A causes the gravity center A to be located at around the center of the four fingers which support the apparatus 1401 from below. Therefore, it is possible to hold the apparatus 1401 in a stable state and particularly to suppress the shake of the front end part 1403*b* of the apparatus 1401 in the vertical direction. Furthermore, since the position of the operation member 1501 becomes a position with which the thumb naturally comes into contact, it is possible to improve the operability of the operation member 1501.

The operation member 1501 is, as with the operation members 501 and 801 in Embodiment 1, a button to be operated by being pressed down while an image is being projected, to perform the switching of projected images or the switching of display/non-display of the pointer in the projected image. It is also a stick to be operated by being tilted to the front, rear, right and left from its non-operated state (neutral state) to move the displayed pointer in the projected image. The operation member 1501 may also be a cross key which is operable by pressing its operating portions provided at its front, rear, right and left positions. Further, an operation member of a mouse-pad type that uses a pressure sensitive sheet and the like may be used.

In the present embodiment as well, operating the operation member 1501 to be tilted to the front, rear, right and left can move the pointer with respect to the projected image depending on the operation direction.

Moving the pointer upward may be achieved by tilting the operation member 1501 to the front side. Also moving the pointer leftward may be achieved by tilting the operation member 1501 to the left. Providing the operation member 1501 in the top face part 1403*a* can cause the user to easily recognize the relationship between the desired direction to move the pointer and the direction to operate the operation member 1501, thus improving ease of operation.

Further, adding a pointer display function to the handy image projection apparatus 1401 whose essential function is to project an image makes it possible to keep the relative positions of the projected image and the pointer unchanged even when the hand which is holding the handy image projection apparatus 1401 shakes. This can avoid the occurrence of a bad visual condition in which the positional relationship between the projected image and the pointer continually changes such as when an image projection apparatus is held with one hand and a laser pointer is held by the other hand.

Moreover, the handy image projection apparatus 1401 may be provided with a plurality of operation members including the operation member 1501. In this case, as with Embodiment 1 (FIG. 8), at least part of each operation member may be disposed within the fore-gravity-center region C. Further, when it is difficult to dispose all of the operation members within the fore-gravity-center region C, the operation member which is operated at a higher frequency while an image is being projected may be disposed in the fore-gravity-center region C and an operation member which is operated less frequently may be disposed outside the fore-gravity-center region C. Furthermore, operation members such as a power source button which is not operated while an image is being projected may be disposed outside the fore-gravity-center region C.

Next, a projection optical unit 1506 in the handy image projection apparatus 1401 of the present embodiment will be described.

Figure 17:
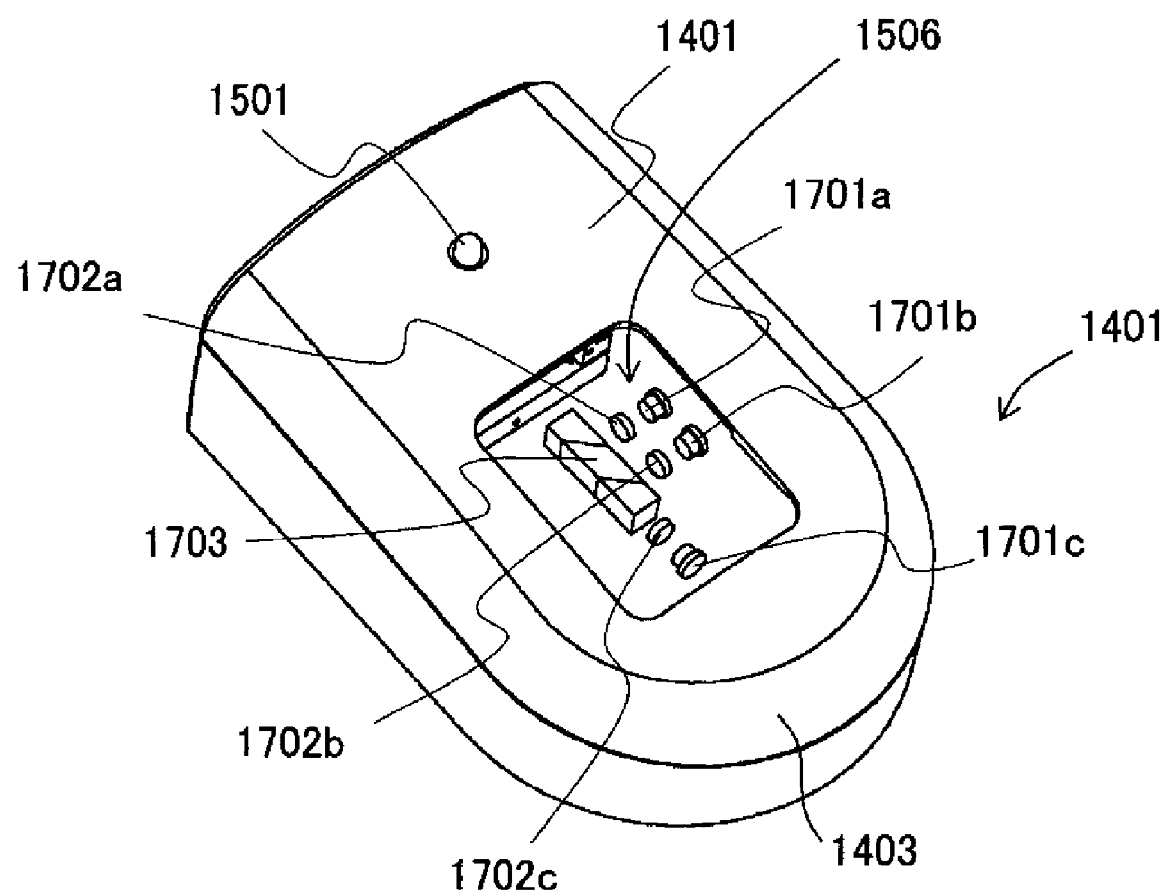
FIG. 17 is a perspective view showing part of the projection optical unit of the handy image projection apparatus of Embodiment 2.

FIG. 17 shows part of the light source system of the projection optical unit 1506, which is accommodated in the housing 1403, with part of the housing 1403 being cut out. Moreover, the projection optical unit 1506 of the present embodiment uses a scanning device described in Embodiment 1.

In FIG. 17, reference numerals 1701*a*, 1701*b*, and 1701*c* designate light sources emitting luminous fluxes of Red, Green, and Blue, respectively.

The luminous fluxes from the light sources 1701*a*, 1701*b*, and 1701*c* enter into a dichroic prism 1703 respectively through collimator lenses 1702*a*, 1702*b*, and 1702*c*. The luminous fluxes of three colors are combined by the dichroic prism 1703 so that a color image is created based on the image information input to the handy image projection apparatus 1401.

In addition, in the present embodiment, the Red light source 1701*a* also serves as the light source for displaying a pointer. Upon the user pressing down the operation member 1501, the drive circuit, not shown, causes a drive signal for pointer display to interrupt into the drive signal (image display signal) of the Red light source 1701*a* for projected image. By this interrupt drive signal, the emitting light amount (luminance) of the Red light source 1701*a* at the scanning position to display the pointer is increased higher than the emitting light amount corresponding to the image. This makes it possible to display a pointer 1408 of Red in the projected image 1402 as shown in FIG. 14.

In this manner, in the present embodiment, using some of the light sources for projecting images concurrently as the light source for displaying a pointer makes it possible to display a pointer without adding new components to the required components as the projection optical unit. This can achieve the reduction in size and weight of the handy image projection apparatus 1401.

Moreover, a DMD may be used for the projection optical unit in the handy image projection apparatus 1401 of the present embodiment. In this case, it is necessary to increase the brightness of the pointer higher than that of the projected image so that the display position of the pointer can be perceived. For this purpose, the tone level of the pointer needs to be higher than that of the projected image. To achieve this, the tone setting may be changed such that the tone level of the projected image is lowered than usual when the pointer display function is used such that the tone level of the pointer becomes higher than that of the projected image.

Further, although in the present embodiment, description has been made of the case in which three color light sources are used for the projection optical unit, when a DMD is used, a white light source and a color wheel may be used. In this case as well, by making the above described tone setting, it is possible to clearly display a pointer in the projected image.

As so far described, according to the present embodiment, the operation member 1501 is disposed at an appropriate position with reference to the position of the gravity center A of the handy image projection apparatus 1401. This offers an advantage in that even when the operation member 1501 is operated while an image is being projected with the apparatus 1401 being held by one hand, it is easy to maintain the posture of the apparatus 1401 almost without changes. Therefore, it is possible to reduce the shake of the projected image in association with the operation of the operation member 1501.

Embodiment 3

Figure 18:
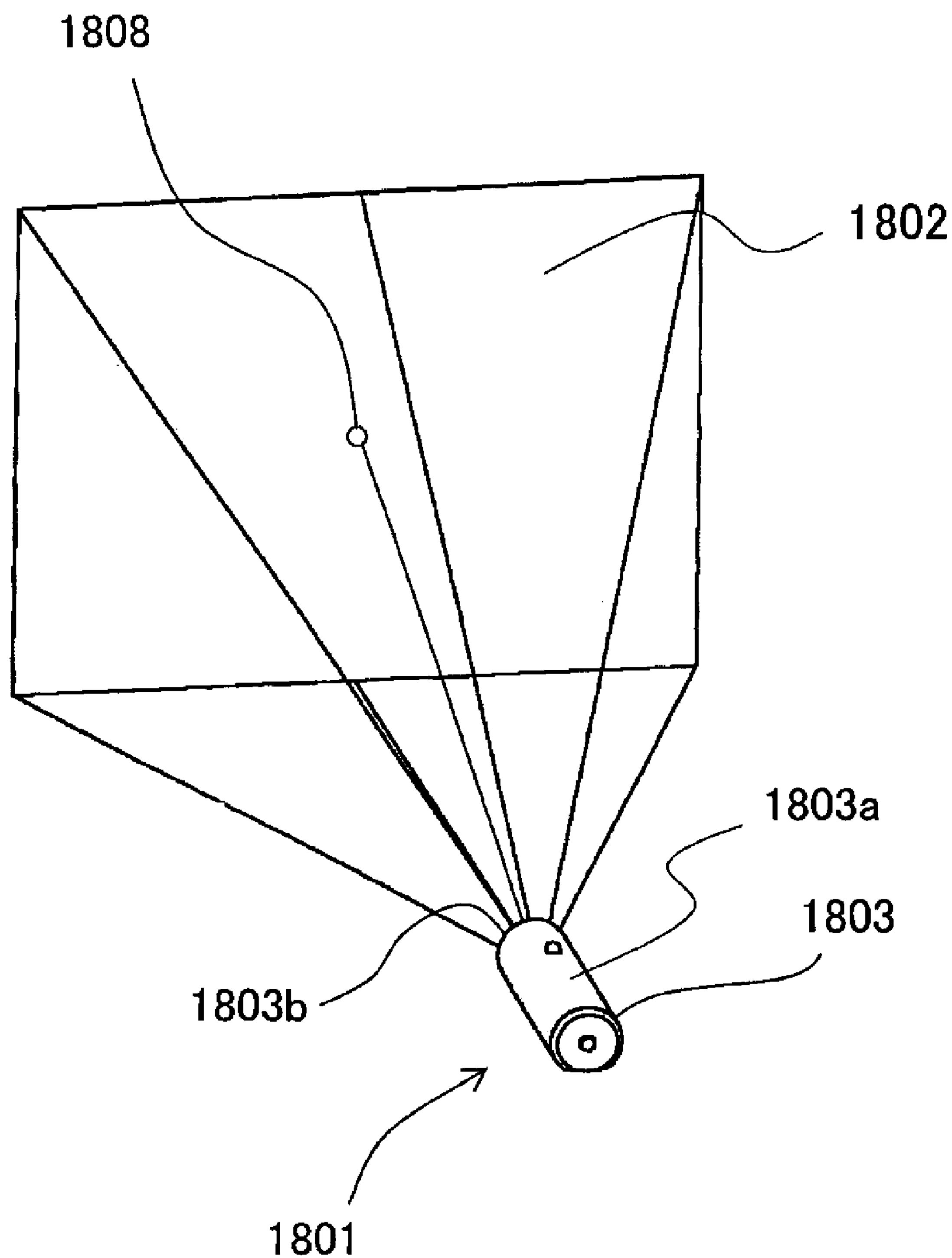
FIG. 18 is a perspective view of the handy image projection apparatus that is Embodiment 3 of the present invention.

FIG. 18 shows a handy image projection apparatus that is Embodiment 3 of the present invention. The handy image projection apparatus 1801 of the present embodiment is a so-called stick-type (pencil-type) handy image projection apparatus.

The handy image projection apparatus 1801 can project an image 1802 from a front end part 1803*b* of the main body (housing 1803) onto a projection surface such as a screen or wall, not shown.

The housing 1803, which provides the appearance of the handy image projection apparatus 1801, is sized to be held with a hand, that is, has a handheld size. Within the housing 1803, a projection optical unit (not shown) which projects an image 1802 onto a projection surface is accommodated. In the present embodiment, a scanning device is used for the projection optical unit as with Embodiments 1 and 2. Further, in the present embodiment, as with Embodiment 2, the projection optical unit has a function of displaying a pointer 1808 which points at a part of a projected image. The main body of the handy image projection apparatus 1801 is made up of the housing 1803, and all the accommodated items in the housing 1803 such as the projection optical unit, and the drive circuit thereof and a battery.

Figure 20:
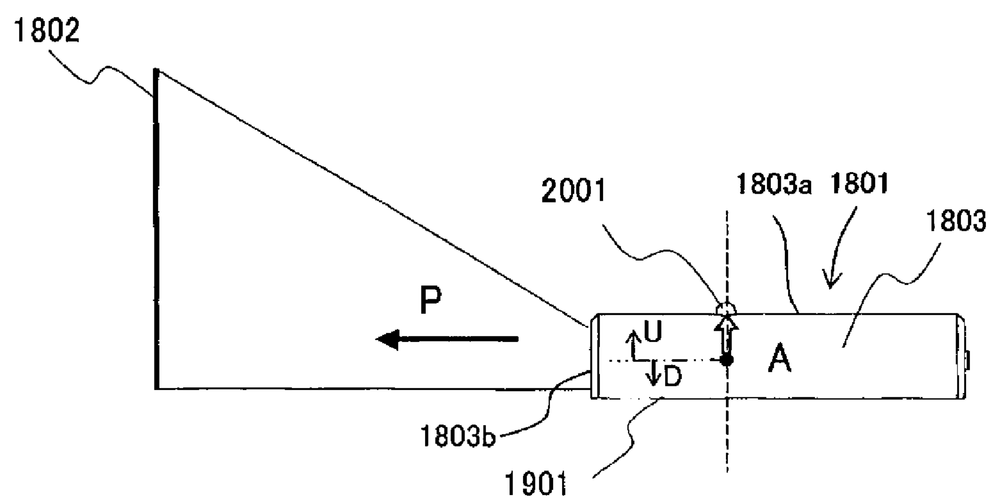
FIG. 20 is a figure showing the positional relationship between the gravity center and the operation member in the handy image projection apparatus of Embodiment 3.

Here, FIG. 20 shows a state of the handy image projection apparatus 1801 (main body) in which the front end part 1803*b* thereof is oriented forwardly (in the horizontal direction). In this state, in the top face part 1803*a* which is located on the upper (U) side than the gravity center A of the apparatus 1801, an operation member 2001 is disposed. Moreover, a bottom face part 1901 is formed on the down (D) side than the gravity center A.

Figure 21:
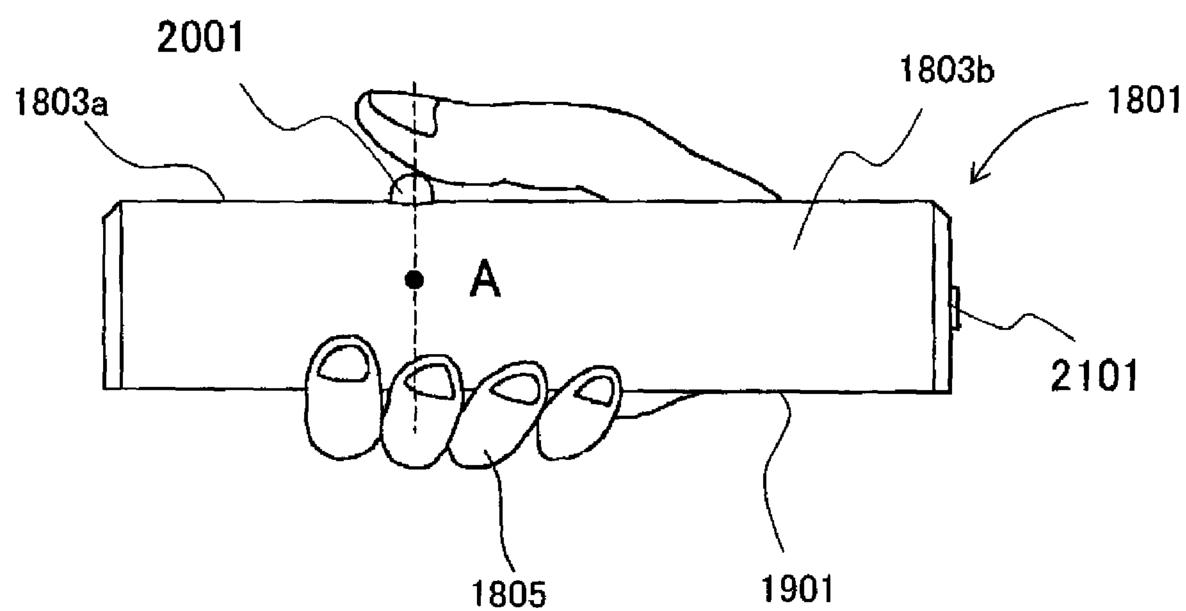
FIG. 21 is an explanatory drawing of the usage state of the handy image projection apparatus of Embodiment 3.

The handy image projection apparatus 1801 of the present embodiment is held by one hand 1805 of the user as shown in FIG. 21. Specifically, the bottom face part 1901 of the housing 1803 is supported from below by the fingers other than the thumb of the one hand 1805. Further, the thumb of the one hand 1805 which is put on the top face part 1803*a* can press down from above the handy image projection apparatus 1801 as well as operate the operation member 2001.

Moreover, although not shown, when the handy image projection apparatus 1801 is seen from above, the gravity center A of the apparatus 1801 is located on the center line in the width direction of the main body (housing 1803) as with Embodiments 1 and 2.

Figure 19:
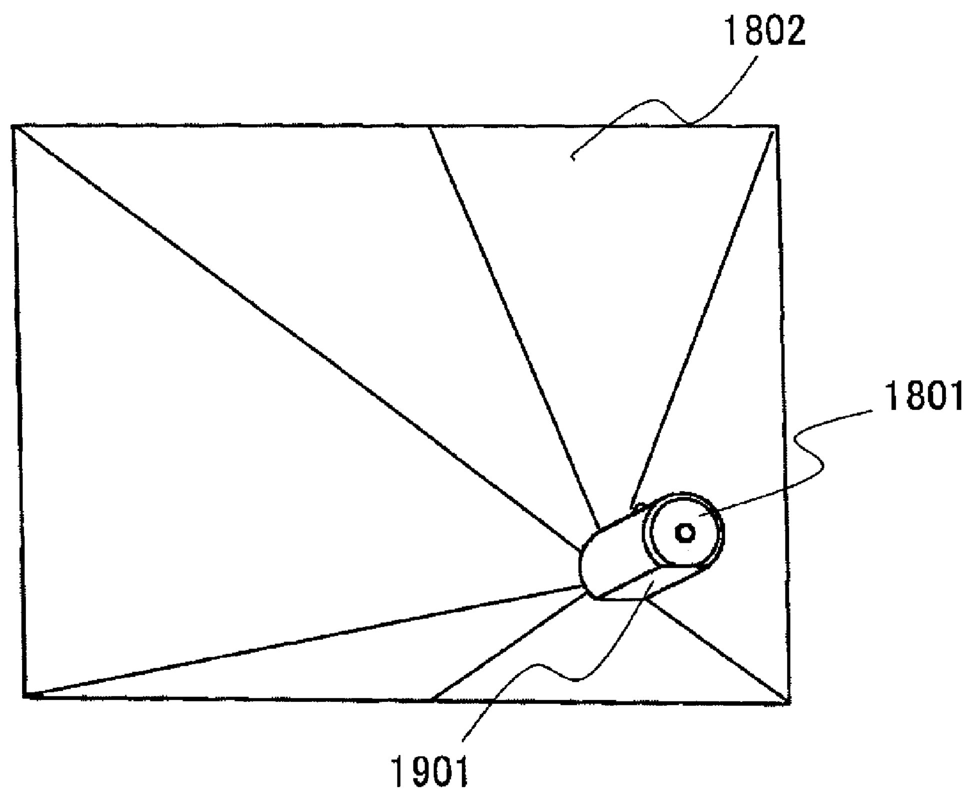
FIG. 19 is a bottom side perspective view of the handy image projection apparatus of Embodiment 3.

Further, in a stick-type handy image projection apparatus such as the present embodiment, when the housing is of a simple cylindrical shape, it can be held with a hand, but it cannot be used by being laid down stably on a base. Therefore, in the handy image projection apparatus 1801 of the present embodiment, a bottom face part 1901 of a flat plane shape is provided in the housing 1803 so that the handy image projection apparatus 1801 can be stably laid down as shown in FIG. 19. Moreover, there may be provided in the bottom face part 1901 with protrusions which serve as a foot, as with Embodiments 1 and 2.

As shown in FIG. 20, the operation member 2001 is disposed such that at least part thereof is located at a position right above the gravity center A of the apparatus 1801. This makes it possible to reduce a moment around the gravity center A which acts on the main body when the operation member 2001 is operated, and to help avoiding the posture of the handy image projection apparatus 1801 from becoming unstable as the operation member 2001 is operated.

Further, the operation member 2001 may be disposed such that at least part thereof is located within the fore-gravity-center region C which has been described in Embodiment 1. Moreover, it is more preferable that the length in the front-rear direction of the fore-gravity-center region C is limited to ⅕ of the length in the front-rear direction of the main body.

The operation member 2001 is a button to be operated by being pressed down while an image is being projected to perform the switching of projected images or the switching of display/non-display of the pointer in the projected image. It is also a stick to be operated by being tilted to the front, rear, right and left from its non-operated state (neutral state) to move the displayed pointer in the projected image. The operation member 2001 may also be a cross key which is operable by pressing its operating portions provided at its front, rear, right and left positions. Further, an operation member of a mouse-pad type that uses a pressure sensitive sheet and the like may be used.

In the present embodiment as well, operating the operation member 2001 to be tilted to the front, rear, right and left can move the pointer with respect to the projected image depending on the operation direction.

Moving the pointer upwardly may be achieved by tilting the operation member 2001 to the front side. Also moving the pointer leftward may be achieved by tilting the operation member 2001 to the left. Providing the operation member 2001 in the top face part 1803*a* makes it possible to cause the user to easily recognize the relationship between the desired direction to move the pointer and the direction to operate the operation member 2001, thus improving ease of operation.

Further, adding a pointer display function to the handy image projection apparatus 1801 whose essential function is to project an image makes it possible to keep the relative positions of the projected image and the pointer unchanged even when the hand which is holding the handy image projection apparatus 1801 shakes. This can avoid the occurrence of a bad visual condition in which the positional relationship between the projected image and the pointer continually changes such as when an image projection apparatus is held with one hand and a laser pointer is held by the other hand.

Moreover, the handy image projection apparatus 1801 may be provided with a plurality of operation members including the operation member 2001. In this case, at least part of each operation member may be disposed within the fore-gravity-center region C. Further, when it is difficult to dispose all of the operation members within the fore-gravity-center region C, the operation member which is operated at a higher frequency while an image is being projected may be disposed in the fore-gravity-center region C and an operation member which is operated less frequently may be disposed outside the fore-gravity-center region C. Furthermore, as shown in FIG. 21, an operation member 2101 such as a power source button which is not operated while an image is being projected may be disposed outside the fore-gravity-center region C (for example, at the rear end part of the main body).

Moreover, a DMD may be used for the projection optical unit of the present embodiment as described in Embodiment 2.

According to the present embodiment, the operation member 2001 is disposed at an appropriate position with reference to the gravity center A of the handy image projection apparatus 1801. This offers an advantage in that even when the operation member 2001 is operated while an image is being projected with the apparatus 1801 being held by one hand, it is easy to maintain the posture of the apparatus 1801 almost without changes. Therefore, it is possible to reduce the shake of the projected image in association with the operation of the operation member 2001.

As so far described, each of the above described embodiments can reduce the posture change of the apparatus even when the operation member is operated while the apparatus is being held with a hand. Furthermore, when the operation member is operated with a finger of the hand which is holding the apparatus, easy operation of the operation member without forcibly stretching or bending the finger can be achieved.

Furthermore, the present invention is not limited to these preferred embodiments and various variations and modifications may be made without departing from the scope of the present invention.

This application claims foreign priority benefits based on Japanese Patent Application No. 2006-219684, filed on Aug. 11, 2006, which is hereby incorporated by reference herein in its entirety as if fully set forth herein.

What is claimed is:

1. A handy image projection apparatus, comprising:

a main body containing a projection optical unit configured to project an image from its front part, the main body having a gravity center;

an operation member configured to be operated to perform switching of projected images or switching of display/non-display of a pointer in the projected image while the image is being projected, the operation member provided on a top face of the main body, and the operation member being operated by a user's hand holding the main body when the image is being projected; and a power supply button configured to operate switching of ON/OFF of a power supply of the handy image projection apparatus, wherein, when the apparatus is viewed from a first direction facing the top face, at least part of the operation member is disposed, in a front-rear direction of the apparatus, at one of a first position corresponding to the gravity center of the main body and a second position located at a distance within ⅓ of a length from the gravity center to the front part of the main body in the front-rear direction, wherein the power supply button is disposed at a position different from the top face of the main body or the first and second positions.

2. The apparatus according to claim 1, wherein, when the apparatus is viewed from the first direction, at least part of the operation member is disposed in the top face of a portion of the main body, the portion extending in the front-rear direction from the position corresponding to the gravity center of the main body to a position located at a distance within ⅕ of the length from the gravity center to the front part of the main body in the front-rear direction.

3. The apparatus according to claim 1, wherein, when the apparatus is viewed from a second direction facing a side of the apparatus, the operation member is provided on the top face of the main body on an upper side portion of the main body when the main body is in a state in which the front part faces a horizontal direction.

4. The apparatus according to claim 1, wherein the operation member is operated in at least one of an upper-lower direction and a front-to-rear and right-to-left direction when the main body is in a state in which the front part faces a horizontal direction.

5. The apparatus according to claim 1, wherein the main body includes an optical unit for displaying a pointer.

6. The apparatus according to claim 5, wherein the operation member is operated to move the display position of the pointer in the projected image.

7. The apparatus according to claim 5, wherein the projection optical unit which projects the image and the optical unit which causes the pointer to be displayed are a common optical unit.

8. The apparatus according to claim 5, wherein the projection optical unit includes a plurality of light sources for displaying the image in the main body, and at least one of the plurality of light sources is used as the light source for displaying the pointer.

9. An image display system, comprising:

a handy image projection apparatus according to claim 1; and an image supply apparatus which supplies image information to the handy image projection apparatus.

* * * * *